Nov. 28, 1933.   R. B. MILLER   1,936,851
MOTOR VEHICLE WHEEL
Filed March 23, 1931   3 Sheets-Sheet 1

Inventor
Richard B. Miller

Nov. 28, 1933.   R. B. MILLER   1,936,851
MOTOR VEHICLE WHEEL
Filed March 23, 1931   3 Sheets-Sheet 3

Inventor
Richard B. Miller

Patented Nov. 28, 1933

1,936,851

UNITED STATES PATENT OFFICE 1,936,851

MOTOR VEHICLE WHEEL

Richard B. Miller, Cleveland, Ohio

Application March 23, 1931. Serial No. 524,591

10 Claims. (Cl. 301—9)

This invention relates to wheels for motor vehicles, and the primary object of the same is to provide a wheel which has beauty of design, is relatively light in weight yet possesses ample strength to withstand the stresses and strains to which wheels of this type are commonly subjected, has an open-type nave construction which serves to ventilate the wheel and reduce the weight thereof, and finally, embodies parts which tend toward ease and economy in manufacture.

Another object of the invention is to provide a motor vehicle wheel which is particularly adapted for low-pressure tires of the exaggerated balloon type and which at the same time has a more pleasing design than the conventional enlarged disk-hub type of wheel used for such tires.

Another object of the invention is to provide a motor vehicle wheel which simulates a wire spoke wheel but which does not depend for its strength solely upon such spokes, the said spokes together with a nave-covering shell member rendering the wheel unusually attractive in appearance.

A further object of the invention is to provide a main central supporting spider or nave member which may be cast or forged and is so designed as to embody great strength while at the same time being light in weight.

The foregoing and other objects and advantages will become apparent in view of the following description taken in conjunction with the drawings, wherein.

Figure 1:
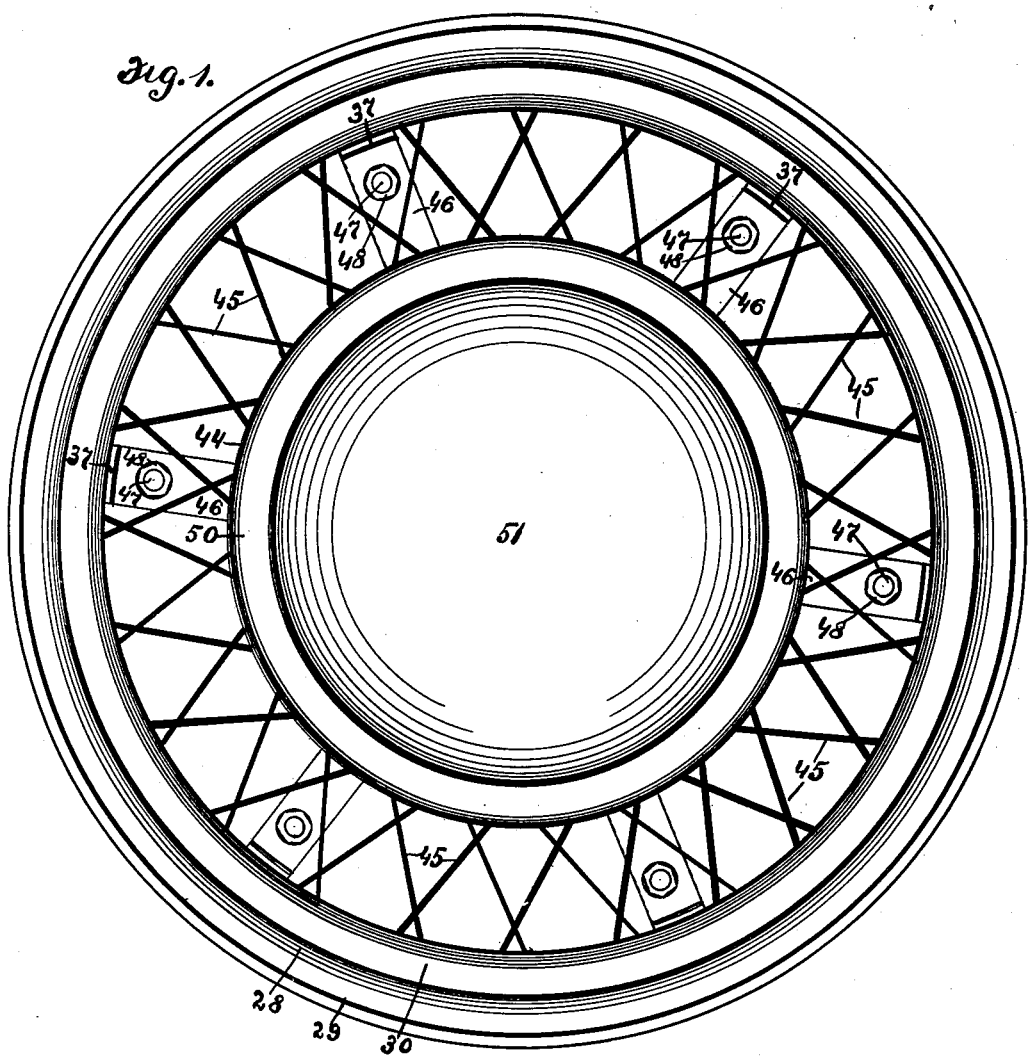
Figure 1 is a view in outboard side elevation of a wheel embodying the features of the invention.
Figure 2:
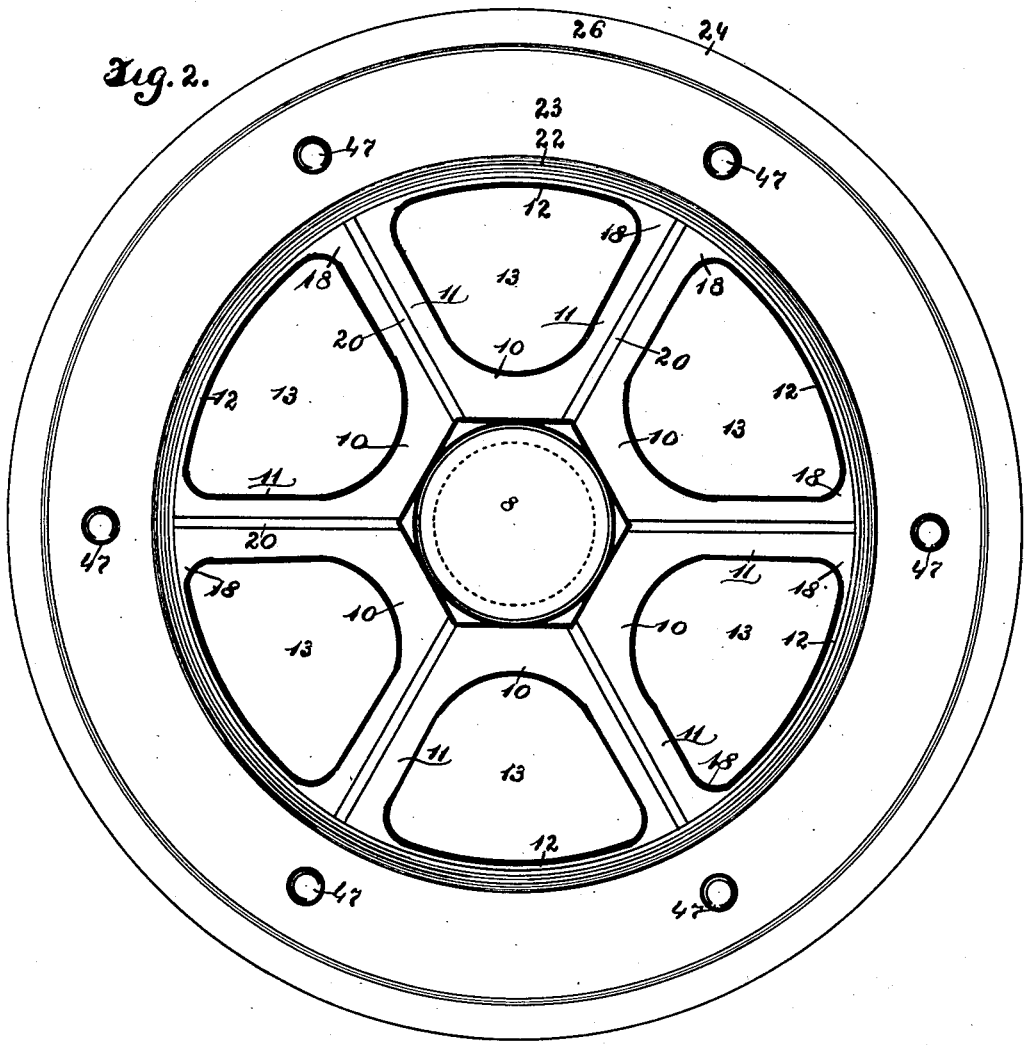
Fig. 2 is a view in outboard side elevation of the main supporting nave or spider member of the wheel.
Figure 3:
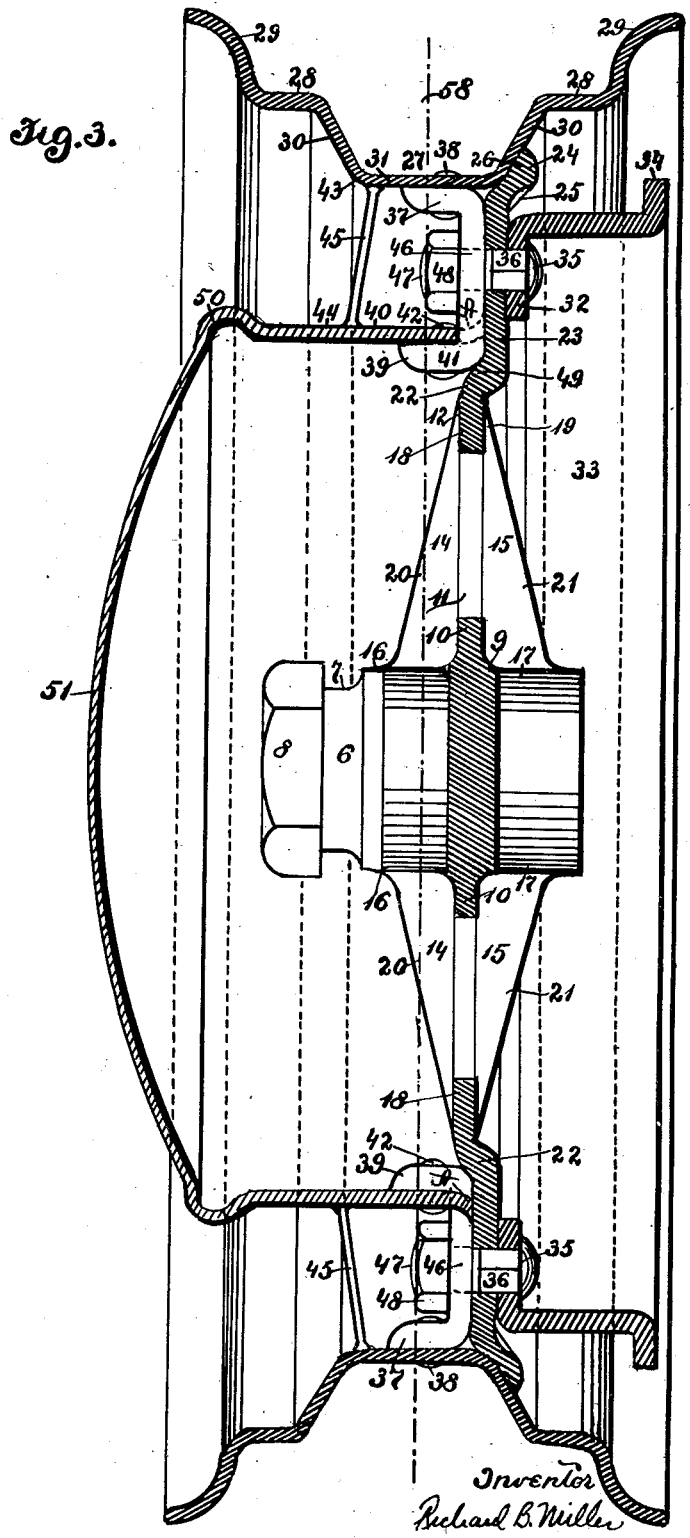
Fig. 3 is a cross section of Fig. 1, showing the interior construction thereof.

The invention in the form illustrated is designated by corresponding characters referring to parts thereof, in which the main supporting nave or spider member comprises a hub barrel 6, to the outer portion 7 of which is threaded a cap or nut 8 to prevent the escape of grease or oily substance from the bore of the hub. On the central annular portion 9 of the hub body are formed a series of circumferentially arranged, curved walls 10, and extending radially outward from said walls 10 are a series of ribs 11 which are merged with adjacent arched circumferentially extended portions 12, forming a reinforced concentric structure and leaving a series of openings 13 therein for decreasing the weight of the main supporting member of the wheel and for permitting air to circulate in the center of the wheel and cool the latter. A supplemental reinforcing rib 14 is formed integral with the outer face and a similar rib 15 is formed integral with the inner face of each of the ribs 11, said supplemental ribs extending radially outwardly from portions 16 and 17 and merging with the circumferential portion 12 as clearly shown at 18 and 19. The ribs 14 and 15 are extended transversely with respect to the hub, and tapered radially as particularly shown at 20 and 21, to provide a reinforced supporting base for each rib. By constructing the ribs as shown in conjunction with the remaining portion of the main supporting member, the said member is rigidly braced against torque thrust and side stresses.

Extending from the circumferential, curved body 22 is an integral vertical disk-like rim-supporting wall which is reinforced by a series of spaced ribs 25, and a tapered rim-bearing face 26 for engagement with a tire rim.

For the purpose of completing the wheel construction any suitable tire rim may be employed, but I prefer, owing to convenience and practicability from a commercial standpoint, to employ the so-called "drop-center" rim construction. The rim is generally designated at 27 and is provided with transverse side ledges 28, a flared flange 29 integral with each ledge, walls 30 which converge towards one another and merge with a transverse base 31.

While the brake drum may be formed integral with the main supporting spider or nave member, I prefer to use a brake drum having a reduced attaching flange which is secured to the said member at a point remote from the hub, to thereby coact to strengthen the entire wheel while leaving the central part of open or chamber-like formation. This type of drum also lends itself more readily to formation of hard wear-resisting material, which material may be rolled into shape instead of being stamped or otherwise shaped in a conventional manner. This rolling method forms the subject matter of a separate application and need not be specifically referred to herein.

The brake drum member as shown comprises an attaching web wall 32, a drum or brake-contacting wall 33 and a peripheral flange 34. Bolts 35 are fixed in openings provided in the web 32 and wall 23 as particularly shown at 36, thereby fastening the brake drum to the main spider or nave member and reinforcing the outer periphery thereof.

For the purpose of providing a readily demountable, strong, yet light, and attractive wheel member, a series of substantially U-shaped brackets 37 are provided. The radially outer transverse portion of each bracket is fixed to the base 31 of the rim 27, as particularly shown at 38, which may be by any suitable means such as riveting or welding, to form a rigid engagement between the rim and bracket, and position the brackets on a line extending radially inwardly from the base of the rim. The radially inner transverse portion 39 of each bracket is fixed to the inner edge portion 40 of a shell member 41, by suitable means such as rivets 42, which may be supplanted by welding or other means of fastening. The base 31 of the tire rim and the intermediate portion 44 of the shell 41 are rigidly connected by a series of wire spokes 45.

It will be seen that the rim, brackets and shell constitute a wheel structure which may be demounted and mounted as a unit with respect to the main supporting nave member. With this object in view, the projecting portions 47 of the bolts 35 are adapted to pass through openings in the brackets 46 and engage with nuts 48, thereby seating the base portions of the brackets 46 on the shoulder 49 of the main supporting member and wedging the inner side of the rim on the tapered bearing seat 26 of said latter member. The inner side of the shell is provided with spaced notches as indicated at A for engagement each with one of the brackets to permit the shell member to snugly engage the disk-like wall 23 of the main supporting nave member.

The shell member is preferably provided with a side, curved portion 50 and an end wall 51, thereby enclosing the open central portion of the wheel and providing a relatively large chamber which serves to aerate the wheel and dissipate heat generated while the wheel is in service on the road. If desired, the end wall 51 or a portion thereof may be made detachable to permit access to the hub without demounting the outer wheel members.

It will be seen that the wheel consists essentially of two component members or units which, while exceedingly light, are strong and economical to produce. The improved wheel is adapted for passenger cars of all types, and may be readily designed to conform to the individual requirements of car manufacturers.

Having thus described my invention, what I desire to secure by Letters Patent is:

1. A metal wheel assembly for motor vehicles, comprising a spider member formed with a hub barrel and an open nave portion terminating in an annular substantially disk-shaped supporting wall whose periphery is transversely inclined to provide a rim-bearing portion, a deeply-drawn shell member of a diameter such as to entirely cover the open nave area of the spider member, a tire rim, means connecting the rim with the shell member to form a wheel member and locking the supporting wall in assembled position with the rim engaging said bearing portion, and a series of spokes connecting said shell and rim.

2. A metal wheel assembly for motor vehicles, comprising a spider member formed with a hub barrel and a substantially disk-shaped peripheral wall formed with a rim-bearing portion, said wall being formed with an annular shoulder, a tire rim adapted to engage said bearing portion, a brake drum having a reduced attaching flange secured to said wall, a deeply-drawn shell member, clamp members seated on said annular shoulder and formed with portions which inseparably engage said shell member and rim and hold them in spaced assembled relation, means for securing said clamps to said spider wall with the rim locked on said bearing portion, and a series of wire spokes joined to said shell and said rim.

3. A metal wheel assembly for motor vehicles, comprising an integral spider member formed with a hub barrel having ribs projecting therefrom in spider formation and merging with a substantially disk-shaped peripheral wall, said wall being formed with an annular shoulder adjacent the outer ends of the ribs and a transversely inclined peripheral rim-bearing portion, a deeply-drawn shell member of a diameter such as to cover the open area of the spider member, a tire rim adapted to engage said bearing portion, a brake drum having an attaching flange of reduced width secured to said wall, a series of clamp members adapted to seat on said annular shoulder and formed with portions which permanently engage and hold the shell and tire rim in spaced assembled relation, means for locking said clamps to said disk-shaped spider wall with the rim locked on said bearing portion, and a series of wire spokes connecting said shell and tire rim.

4. A metal wheel assembly for motor vehicles, comprising an integral spider member formed with a hub barrel and a substantially disk-shaped wall adapted to form a support for the component parts of the wheel, said wall being joined to the hub barrel by a series of ribs which taper from said barrel to said wall and support the latter in substantially radial alinement with the intermediate portion of the barrel, said wall being transversely offset adjacent the outer ends of the ribs to form an annular supporting shoulder in radial alinement with the ribs and the periphery of said wall being transversely inclined to form a rim-bearing portion, a deeply-drawn shell member of a diameter such as to cover the open rib area and annular shoulder of said spider member, a tire rim adapted to engage said bearing portion, a brake drum having a reduced attaching flange which is secured to said wall, a series of clamps adapted to seat on said shoulder and formed with portions which are fastened to said rim and shell and hold said parts in spaced assembled relation, a series of wire spokes joined to said shell and said rim, and means for demountably securing said clamps to said wall with the rim locked on said bearing portion.

5. In a metal wheel assembly for motor vehicles, a spider member comprising a hub, an open nave area and a substantially disk-shaped peripheral wall adapted to support parts of the wheel, said wall being transversely inclined at its periphery to provide a rim-bearing portion, a deeply-drawn shell member of a diameter sufficient at least to cover said open nave area, a tire rim adapted to engage said bearing portion, a series of wire spokes connecting said shell and rim, a series of clamps attached to said shell and rim and holding them in spaced assembled position, and means for demountably securing said clamps together with the shell member and rim to said wall with the rim locked on said bearing portion.

6. In a metal wheel assembly for motor vehicles, a spider member comprising an open nave area and a substantially disk-shaped wall adapted to support parts of the wheel, said wall being transversely inclined at its periphery to provide a rim-bearing portion, a deeply-drawn shell member of a diameter sufficient at least to cover said open nave area, a tire rim adapted to engage said portion, a series of wire spokes connecting said shell and rim, a series of clamps each formed with transversely-outwardly projecting portions which are secured to said shell and rim and hold them in spaced assembled position, locking bolts passed through said clamps and wall for holding the shell, rim and clamp assembly in demountable engagement with the spider member, and nuts on the bolts locking the parts together.

7. In combination with a wheel supporting member, a tire rim, a deeply formed shell and clamping members, each clamping member comprising a vertical portion and integral laterally-outwardly extending portions, the vertical portion being formed with a bolt-passing opening, and the laterally-outwardly extending portions of the clamping members being fastened to the base of the tire rim and to the inboard side of the said shell, respectively, to position the rim and shell in spaced relation, and wire spokes attached to the rim and shell to complete the construction.

8. The combination with a vehicle wheel supporting member, of a wheel member comprising a tire-rim, a shell, wire spokes and clamping members, the latter each being of U-shape in vertical section, each clamping member being formed with a bolt passing opening, the said clamping members being fastened spacedly to the rim and shell thereby spacing them radially one in relation to another, said wire spokes being fastened to the rim and shell to complete the symmetrical outer appearance of the wheel member.

9. A metal wheel assembly for motor vehicles comprising a main central supporting member formed with a hub barrel and a radially extending wall which is formed with an offset defining a shoulder and terminates in a peripheral rim-bearing portion, a tire rim adapted to engage said bearing portion, a shell member of a diameter such as to encompass the said shoulder, a series of wire spokes and mounting brackets connecting said shell and rim and forming an outer wheel member, and means for mounting said member on said wall with the rim engaging said bearing portion and the radially-inner ends of said brackets seated on said shoulder.

10. A metal wheel assembly comprising a main central supporting member formed with a hub barrel and a nave portion terminating in an annular substantially disk-shaped supporting wall whose periphery is provided with a rim-bearing portion, a tire rim adapted to engage said bearing portion, a shell member of a diameter such as to encompass the said nave portion, mounting brackets and a series of relatively short wire spokes connecting said rim and shell member to provide a unitary outer wheel member, and means for demountably securing said brackets to said supporting wall with the rim in wedged engagement with said bearing portion.

RICHARD B. MILLER.